United States Patent
Sardella et al.

(10) Patent No.: US 7,062,594 B1
(45) Date of Patent: Jun. 13, 2006

(54) ROOT COMPLEX CONNECTION SYSTEM

(75) Inventors: Steven D. Sardella, Marlborough, MA (US); Douglas Sullivan, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 148 days.

(21) Appl. No.: 10/881,553

(22) Filed: Jun. 30, 2004

(51) Int. Cl.
*G06F 13/36* (2006.01)
*G06F 13/00* (2006.01)

(52) U.S. Cl. ............ 710/314; 710/300; 710/312; 710/316

(58) Field of Classification Search ........ 710/260, 710/305, 300, 312, 314, 316; 326/86; 370/401; 379/166
See application file for complete search history.

(56) References Cited

U.S. PATENT DOCUMENTS

| | | | |
|---|---|---|---|
| 5,991,844 A * | 11/1999 | Khosrowpour | 710/312 |
| 6,256,689 B1 * | 7/2001 | Khosrowpour | 710/300 |
| 6,590,422 B1 * | 7/2003 | Dillon | 326/86 |
| 6,622,191 B1 * | 9/2003 | Nakamura | 710/260 |
| 6,662,254 B1 * | 12/2003 | Tal et al. | 710/300 |
| 2002/0031132 A1 * | 3/2002 | McWilliams | 370/401 |
| 2003/0065869 A1 * | 4/2003 | Balay et al. | 710/314 |

* cited by examiner

*Primary Examiner*—Glenn A. Auve
*Assistant Examiner*—Christopher E. Lee
(74) *Attorney, Agent, or Firm*—Krishnendu Gupta; Scott A. Ouellette

(57) ABSTRACT

A data processing system includes first and second data processing devices coupled to each other through a midplane. Each data processing device includes a data storage processor; a root complex coupled to the data storage processor; and a switch device coupled between the root complex and at least one end point device. The switch device includes a first transparent bridge coupled to the root complex and a second transparent bridge coupled between the first transparent bridge and the at least one end point device, a first data path connected between the first transparent bridge and the midplane and a second data path connected between the first transparent bridge and the midplane through a non-transparent bridge. The first data path of the first data processing device is connected to the second data path of the second data processing device through the midplane and the second data path of the first data processing device is connected to the first data path of the second data processing device through the midplane, such that data transmitted between the root complexes of each of the first and second data processing devices is transmitted through only one non-transparent bridge.

14 Claims, 2 Drawing Sheets

US 7,062,594 B1

ROOT COMPLEX CONNECTION SYSTEM

FIELD OF THE INVENTION

The present invention is directed generally to a root complex connection system and, more particularly, to a system for connecting two root complexes through redundant low-voltage differential signaling (LVDS) protocol paths using minimal non-transparent connections.

BACKGROUND OF THE INVENTION

Data storage systems can include two storage processors for handling the data processing and caching operations of the storage system. The two storage processors enable the system to perform up to twice as much work in parallel than a single processor and enable the system to be cache-enabled. Write data that is processed by the storage processors is eventually written to disk drives in the disk drive array. However, because the process of writing data to a disk drive takes much longer than the amount of time required by the storage processor to process incoming data, the data is stored in cache memory before it is finally written to the disk drive. This type of data is called write cache data because it is in the process of being written to the disk drive, but has not yet been written to the disk drive.

Both storage processors process data read and write commands for the system concurrently. In order to prevent a loss of all write cache data stored in the cache memory associated with a particular processor in the event that the particular processor becomes unavailable or fails, the write cache data is stored in the cache memories associated with both storage processors through a mechanism called mirroring. Data mirroring involves providing an exact copy of all data on each storage processor's cache memory to the cache memory of the other storage processor. This is done so that, at any point in time, the cache memories associated with each storage processor are exactly the same. In the event that one of the storage processors should fail, none of its write cache data is lost, because it has been stored on the "peer" storage processor with which the failed storage processor cooperates. The communication between storage processors can be configured according to a number of different protocols, such as PCI-Express, which is a low-voltage differential signaling protocol.

When a storage processor is powered up, it must perform a discovery operation to ascertain what devices are configured in the system with which it is associated so that it can configure the devices into its memory space. However, when two or more storage processors are connected to communicate with each other, it is important that each storage processor be able to enumerate its associated memory space upon power-up without attempting to enumerate the memory space associated with its peer. Transparent bridges are typically used to connect the root complex associated with each storage processor to downstream devices in a way that enables the storage processor to include the downstream devices in its enumeration process. The use and operation of transparent bridges for this purpose is known in the art.

In order to prevent one storage processor from enumerating devices that are associated with the peer storage processor, the communication link between the storage processors utilize non-transparent bridges. As is known in the art, non-transparent bridges enable data transactions to be forwarded from one side of the non-transparent bridge to the other, however, to the storage processors on either side of the non-transparent bridge, the non-transparent bridge appears to be an endpoint to the discovery and configuration software of each storage processor. This eliminates the possibility of one storage processor enumerating devices that are associated with its peer. While both transparent and non-transparent bridges provide a path between two independent data buses, in the case of a non-transparent bridge, devices on the downstream side of a non-transparent bridge are not visible from the upstream side of the non-transparent bridge. The use and operation of non-transparent bridges for this purpose is known in the art.

FIG. 1 is a schematic diagram of a prior art data processing system 100 that utilizes transparent and non-transparent bridges. The system 100 includes a first data processing device 120a and a second data processing device 120b. Data processing devices 120a and 120b are identically configured, thus enabling the design and manufacture of a single part, to reduce development and manufacturing costs. Each data processing device 120a, 120b includes a storage processor 102a, 102b, which controls the operation of the data processing device. A root complex 104a, 104b is connected between the storage processor 102a, 102b and a switch device 106a, 106b. In a PCI-Express-protocol system, the root complex 104a, 104b is the PCI-Express version of a Northbridge, which transmits data between the storage processor 102a, 102b and the switch 106a, 106b. Each switch 106a, 106b includes a number of transparent bridges 110a–110f. As Shown in FIG. 1, in the case of switch 106a, transparent bridge 110a is coupled to root complex 104a to enable the transmission of data to and from the root complex 104a. Transparent bridge 110b is connected between transparent bridge 110a and an end point device 108a for enabling the transmission of data to and from the end point device 108a and transparent bridge 110c is connected between transparent bridge 110a and an end point device 108b for enabling the transmission of data to and from the end point device 108b. The configuration of transparent bridges 110d–110f in switch 106b is identical to that of transparent bridges 110a–110c of switch 106a. Transparent bridges 110d–110f enable the transmission of data to and from root complex 104b, end point device 108c and end point device 108d, respectively.

Switches 106a, 106b each also include a non-transparent bridge 114a, 114b coupled between transparent bridge 110a, 110b, respectively, and the midplane 116. As discussed above, the non-transparent bridges 114a, 114b enable communications between the data processing devices 120a and 120b while blocking the downstream elements from the discovery and configuration software of the upstream storage processor.

Upon power-up, each storage processor 102a, 102b begins enumerating to determine the topology. The processor will pass through the root complex 104a, 104b and enter the switch 106a, 106b. It will then enter the transparent bridge 110a, 110b. Since the bridge is transparent, the storage processor will continue to enumerate. The storage processor 102a, 102b will pass through transparent bridges 110b, 110c; 110e, 110f and will discover end points 108a, 108b; 108c, 108d. Upon discovering the endpoints, the storage processor does not explore further along that path. The storage processor 102a, 102b then reaches non-transparent bridge 114a, 114b. The storage processor detects the non-transparent bridge 114a, 114b as an end point and explores no further from that point. The storage processor reads the base address register (BAR) of the non-transparent bridge to determine the memory requirements for windows into the memory space on the downstream side of the non-transparent bridge 114a, 114b. The memory space requirements can be preloaded from an EEPROM (not shown) into the BAR Setup Registers of the non-transparent bridge 114a, 114b.

As shown in FIG. 1, the switch 106a, 106b, utilizing the PCI-Express protocol, includes 24 lanes of communication, including eight lanes for each of transparent bridges 110b, 110c; 110e, 110f and eight lanes for the non-transparent bridge 114a, 114b. All eight lanes pass through the non-transparent bridges 114a, 114b to connect the storage processing devices at the midplane 116. Therefore, any data transmitted from one storage processor to the other must pass through two non-transparent bridges, which increases the latency of the system. Furthermore, the cost, size and complexity of the switch is increased because of the additional hardware required for two full eight lane non-transparent bridges.

SUMMARY OF THE INVENTION

The present invention is directed to a data processing system that utilizes two identical data processing devices. The storage processors of each data processing device communicate with each other across the midplane utilizing a non-transparent bridge device in each data processing device that is responsible for handling less than all of the data lanes that connect the first and second data processing devices. The non-transparent bridges are smaller in size than the prior art non-transparent bridges, and thus reduce the cost and complexity of the data processing devices. Furthermore, because the data on any particular lane only passes through one non-transparent bridge, the latency of the system is reduced by as much as half when compared to the prior art system.

In one embodiment, a data processing system includes first and second data processing devices coupled to each other through a midplane. Each data processing device includes a data storage processor; a root complex coupled to the data storage processor; and a switch device coupled between the root complex and at least one end point device. The switch device includes a first transparent bridge coupled to the root complex and a second transparent bridge coupled between the first transparent bridge and the at least one end point device, a first data path connected between the first transparent bridge and the midplane and a second data path connected between the first transparent bridge and the midplane through a non-transparent bridge. The first data path of the first data processing device is connected to the second data path of the second data processing device through the midplane and the second data path of the first data processing device is connected to the first data path of the second data processing device through the midplane, such that data transmitted between the root complexes of each of the first and second data processing devices is transmitted through only one non-transparent bridge.

The first and second data paths may conform to a low voltage differential signaling (LVDS) protocol, such as the PCI-Express protocol, the Hypertransport protocol and the sRIO protocol. Each of the first data path of each data processing system and the second data path of each data processing system may include four data links. The first data path of each data processing system and the second data path of each data processing system may include redundant data paths.

According to another embodiment, a data processing system includes first and second data processing devices coupled to each other through a midplane, each data processing device including a data storage processor; a root complex coupled to the data storage processor; and a first data path coupled between the root complex and the midplane and a second data path coupled between the root complex and the midplane through a non-transparent bridge. The first data path of the first data processing device is connected to the second data path of the second data processing device through the midplane and the second data path of the first data processing device is connected to the first data path of the second data processing device through the midplane, such that data transmitted between the root complexes of each of the first and second data processing devices is transmitted through only one non-transparent bridge.

BRIEF DESCRIPTION OF THE DRAWINGS

These and other features of the invention will become more readily apparent from the following detailed description when read together with the accompanying drawings, in which.

DETAILED DESCRIPTION

Figure 1:
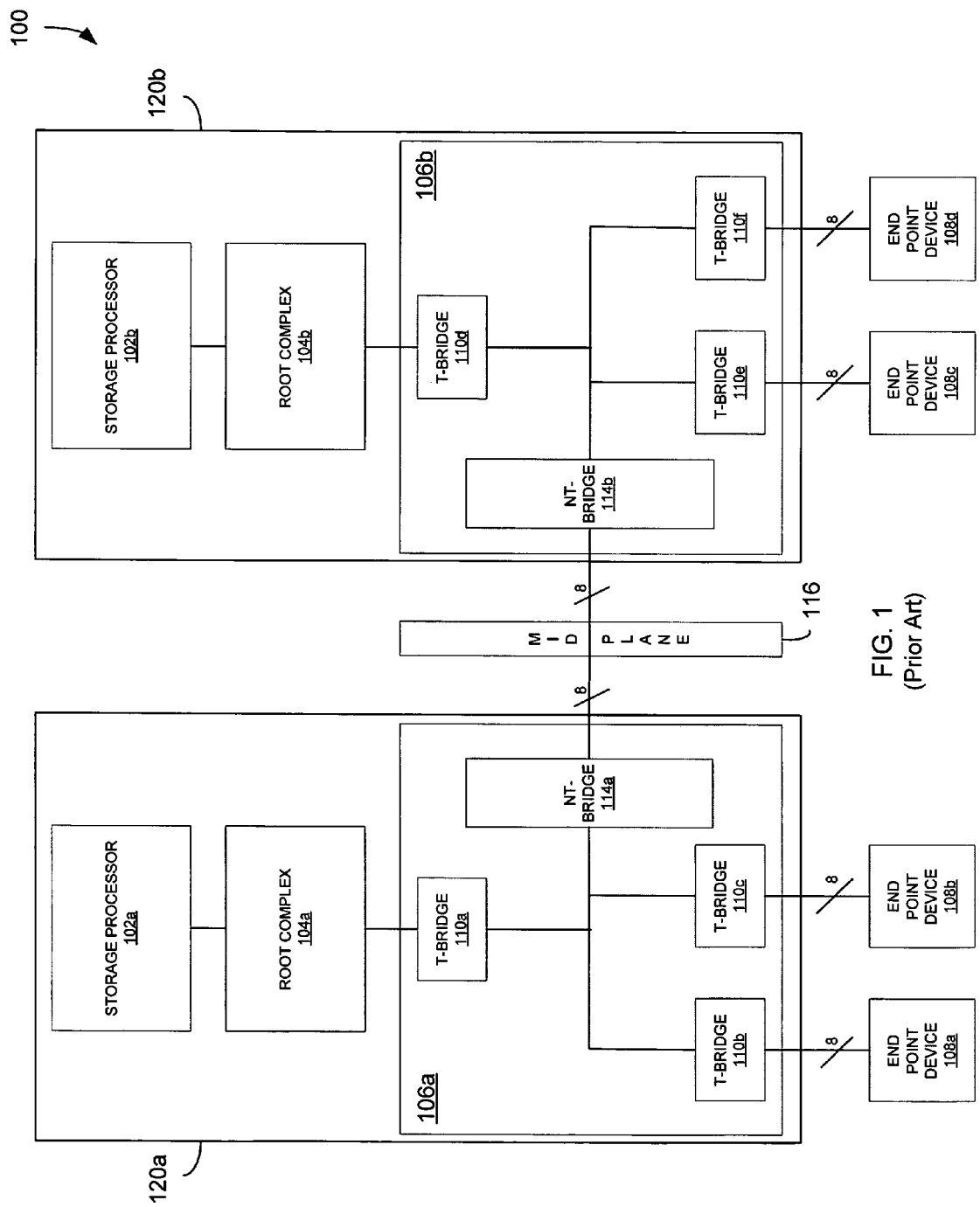
FIG. 1 is a schematic block diagram of a prior art data processing system including storage processors and root complexes that communicate with each other according to a LVDS protocol.
Figure 2:
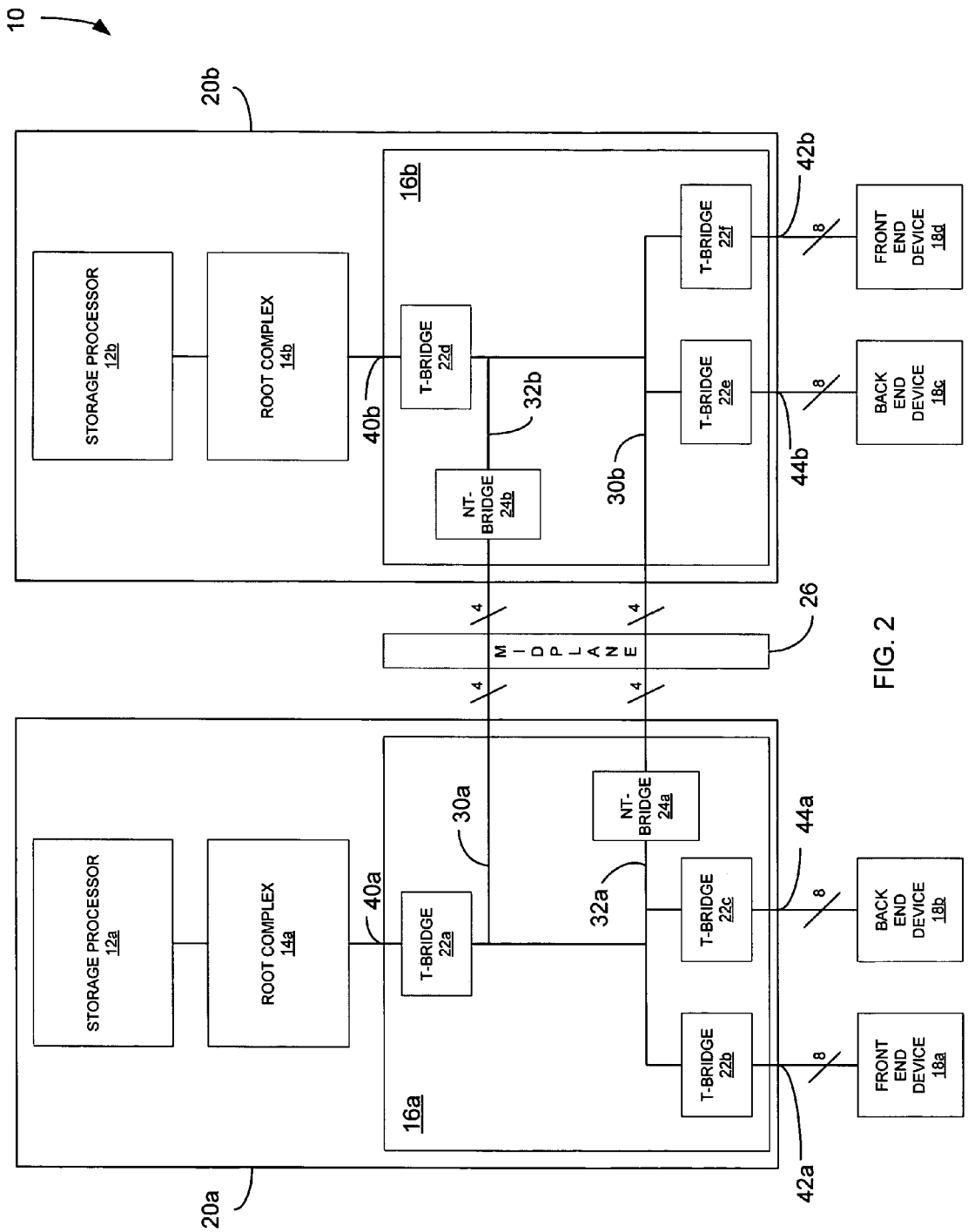
FIG. 2 is a schematic block diagram of a data processing system including storage processors and root complexes that communicate with each other according to a LVDS protocol in accordance with the present invention.

FIG. 2 is a schematic diagram of a data storage system 10 according to the present invention that utilizes transparent and non-transparent bridges. The system 10 includes a first data processing device 20a and a second data processing device 20b. Data processing devices 20a and 20b are identically configured, thus enabling the design and manufacture of a single part, to reduce development and manufacturing costs. Each data processing device 20a, 20b includes a storage processor 12a, 12b, which controls the operation of the data processing device. A root complex 14a, 14b is connected between the storage processor 12a, 12b and a switch device 16a, 16b. The root complex 14a, 104b is the PCI-Express version of a Northbridge, and transmits data between the storage processor 12a, 12b and the switch 16a, 16b. While this embodiment of the invention is described as implementing the PCI-Express protocol, it will be understood that any serialized bus LVDS protocol may be utilized in the present invention, including Hypertransport and RapidIO.

Each switch 16a, 16b includes a number of transparent bridges 22a–22f. As Shown in FIG. 2, in the case of switch 16a, transparent bridge 22a is coupled to root complex 14a through an upper port 40a of switch 16a to enable the transmission of data to and from the root complex 14a through the transparent bridge 22a. Transparent bridge 22b is connected between transparent bridge 22a and an end point device 18a through a first port 42a of switch 16a for enabling the transmission of data to and from the end point device 18a and transparent bridge 22c is connected between transparent bridge 22a and an end point device 18b through a second port 44a of switch 16a for enabling the transmission of data to and from the end point device 18b. In the preferred embodiment, end point 18a is a front end device of the data storage system 10, which typically includes a connection device for at least the host computer that is communicating data read and write requests to the data processing device 20a. End point 18b is preferably a back end device, which typically includes a connection device for at least the data storage array to which the data read and write requests from the host computer are communicated by the data processing device 20a. The configuration of transparent bridges 22d–22f in switch 16b is identical to that of transparent bridges 22a–22c of switch 16a. Transparent bridges 22d–22f enable the transmission of data to and from root complex 14b, end point device 18c and end point device 18d, respectively, through ports 40a, 42a and 44b, respectively. Likewise, end point 18d is a front end device of the data storage system 10, which typically includes a connection device for at least the host computer that is communicating data read and write requests to the data processing device 20b and end point 18c is preferably a back end device, which typically includes a connection device for at least the data storage array to which the data read and write requests from the host computer are communicated by the data processing device 20b. Front end devices 18a and 18d may be a single front end device or two or more discrete front end devices and back end devices 18b and 18c may be a single back end device or two or more discrete back end devices.

Switches 16a, 16b each also include a non-transparent bridge 24a, 24b coupled between transparent bridge 22a, 22b, respectively, and the midplane 26. As discussed above, the non-transparent bridges 24a, 24b enable communications between the data processing devices 20a and 20b while blocking the downstream elements from the discovery and configuration software of the upstream storage processor. As shown in FIG. 2, a total of 8 LVDS data lanes are connected between switch 16a and switch 16b through the midplane 26. A first data path 30a of switch 16a connects 4 LVDS data lanes from the transparent bridge 22a directly to the midplane 26 and a second data path 32a connects the other 4 LVDS lanes from the transparent bridge 22a to the midplane 26 through the non-transparent bridge 24a. Likewise, a first data path 30b of switch 16b connects 4 LVDS data lanes directly to the midplane 26 and a second data path 32b connects the other 4 LVDS lanes from the transparent bridge 22d to the midplane 26 through the non-transparent bridge 24b. The connections between the data processing device 20a and 20b are configured such that the first data path 30a of switch 16a is connected to the second data path 32b of switch 16b through the midplane 26 and the second data path 32a of switch 16a is connected to the first data path 30b of switch 16b through the midplane 26. In the preferred embodiment, data paths 30a and 32a of switch 16a are redundant data paths for communication between the root complex 14a and the midplane 26 and data paths 30b and 32b of switch 16b are redundant data paths for communication between the root complex 14b and the midplane 26.

Upon power-up, each storage processor 12a, 12b begins enumerating to determine the topology. It will pass through the root complex 14a, 14b and enter the switch 16a, 16b. It will then enter the transparent bridge 22a, 22b. Since the bridge is transparent, the storage processor will continue to enumerate. The storage processor 12a, 12b will pass through transparent bridges 22b, 22c; 22e, 22f and will discover end points 18a, 18b; 18c, 18d. Upon discovering the endpoints, the storage processor does not explore further along those paths. In the case of data processing device 20a, the storage processor 12a then reaches data paths 30a and 32a. Upon reaching non-transparent bridge 24a on data path 32a, the storage processor 12a detects the non-transparent bridge 24a as an end point and explores no further from that point. The storage processor 12a reads the base address register (BAR) of the non-transparent bridge 24a to determine the memory requirements for windows into the memory space on the downstream side of the non-transparent bridge 24a. The memory space requirements can be preloaded from an EEPROM (not shown) into the BAR Setup Registers of the non-transparent bridge 24a. Along data path 30a, storage processor 12a enumerates through the midplane until it reaches non-transparent bridge 24b. The storage processor 12a detects the non-transparent bridge 24b as an end point and explores no further from that point. The storage processor 12a reads the base address register (BAR) of the non-transparent bridge 24b to determine the memory requirements for windows into the memory space on the downstream side of the non-transparent bridge 24b. The memory space requirements can be preloaded from an EEPROM (not shown) into the BAR Setup Registers of the non-transparent bridge 24b.

Likewise, in the case of data processing device 20b, the storage processor 12b then reaches data paths 30b and 32b. Upon reaching non-transparent bridge 24b on data path 32b, the storage processor 12b detects the non-transparent bridge 24b as an end point and explores no further from that point. The storage processor 12b reads the base address register (BAR) of the non-transparent bridge 24b to determine the memory requirements for windows into the memory space on the downstream side of the non-transparent bridge 24b. Again, the memory space requirements can be preloaded from the EEPROM into the BAR Setup Registers of the non-transparent bridge 24b. Along data path 30b, storage processor 12a enumerates through the midplane 26 until it reaches non-transparent bridge 24a. The storage processor 12b detects the non-transparent bridge 24a as an end point and explores no further from that point. The storage processor 12b reads the base address register (BAR) of the non-transparent bridge 24a to determine the memory requirements for windows into the memory space on the downstream side of the non-transparent bridge 24a. The memory space requirements can be preloaded from the EEPROM into the BAR Setup Registers of the non-transparent bridge 24a.

Accordingly, a data communication from the root complex 14a to the root complex 14b will pass over either data path 30a or 32a of switch 16a, depending on which of the data paths is the active path, through the midplane 26 and through data path 32b or 30b, respectively. Along either path 30a or 32a of switch 16a, the data communication will encounter a non-transparent bridge: it will encounter non-transparent bridge 24b if the data communication passes through data path 32a of switch 16a and non-transparent bridge 24a if the data communication passes through data path 30a of switch 16a.

This configuration provides the function of the non-transparent bridges without doubling up the non-transparent bridge on any one data lane, which results in a redundancy of the non-transparent bridge function. This enables the storage processors to properly enumerate their memory space, while reducing the cost, size and complexity of the data processing devices 20a, 20b. Furthermore, because data communications between the storage processors need only pass through a single non-transparent bridge, the latency of the data processing system 10 is reduced by as much as half when compared to the prior art system.

The invention may be embodied in other specific forms without departing from the spirit or essential characteristics thereof. For example, while the invention has been described as having four LVDS data lanes passing directly to the midplane from the root complex and four LVDS data lanes passing through a non-transparent bridge between the root complex and the midplane, it will be understood that any combination of data lanes passing directly to the midplane and passing to the midplane through the non-transparent bridge may be utilized, as long as each data lane passes through only one non-transparent bridge. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data processing system comprising:
    first and second data processing devices coupled to each other through a midplane, each data processing device including:
        a data storage processor;
        a root complex coupled to the data storage processor;
        a switch device coupled between the root complex and at least one end point device; and
        the switch device including a first transparent bridge coupled to the root complex and a second transparent bridge coupled between the first transparent bridge and the at least one end point device;
        the switch further comprising a first data path connected between the first transparent bridge and the midplane and a second data path connected between the first transparent bridge and the midplane through a non-transparent bridge;
    wherein the first data path of the first data processing device is connected to the second data path of the second data processing device through the midplane and the second data path of the first data processing device is connected to the first data path of the second data processing device through the midplane, such that data transmitted between the root complexes of each of the first and second data processing devices is transmitted through only one non-transparent bridge.

2. The data processing system of claim 1 wherein the first and second data paths conform to a low voltage differential signaling (LVDS) protocol.

3. The data processing system of claim 2 wherein the LVDS protocol is the PCI-Express protocol.

4. The data processing system of claim 2 wherein the LVDS protocol is the Hypertransport protocol.

5. The data processing system of claim 2 wherein the LVDS protocol is the sRIO protocol.

6. The data processing system of claim 1 wherein each of the first data path of each data processing system and the second data path of each data processing system comprise four data links.

7. The data processing system of claim 1 wherein the first data path of each data processing system and the second data path of each data processing system include redundant data paths.

8. A data processing system comprising:
    first and second data processing devices coupled to each other through a midplane, each data processing device including:
        a data storage processor;
        a root complex coupled to the data storage processor; and
        a first data path coupled between the root complex and the midplane and a second data path coupled between the root complex and the midplane through a non-transparent bridge;
    wherein the first data path of the first data processing device is connected to the second data path of the second data processing device through the midplane and the second data path of the first data processing device is connected to the first data path of the second data processing device through the midplane, such that data transmitted between the root complexes of each of the first and second data processing devices is transmitted through only one non-transparent bridge.

9. The data processing system of claim 8 wherein the first and second data paths conform to a low voltage differential signaling (LVDS) protocol.

10. The data processing system of claim 9 wherein the LVDS protocol is the PCI-Express protocol.

11. The data processing system of claim 9 wherein the LVDS protocol is the Hypertransport protocol.

12. The data processing system of claim 9 wherein the LVDS protocol is the sRIO protocol.

13. The data processing system of claim 8 wherein each of the first data path of each data processing system and the second data path of each data processing system comprise four data links.

14. The data processing system of claim 8 wherein the first data path of each data processing system and the second data path of each data processing system include redundant data paths.

* * * * *